E. W. BOTTLE.
ELECTRICALLY OPERATED SYSTEM OF AND APPARATUS FOR AUTOMATIC SIGNALING ON RAILWAYS.
APPLICATION FILED OCT. 31, 1914.
1,140,659.
Patented May 25, 1915.
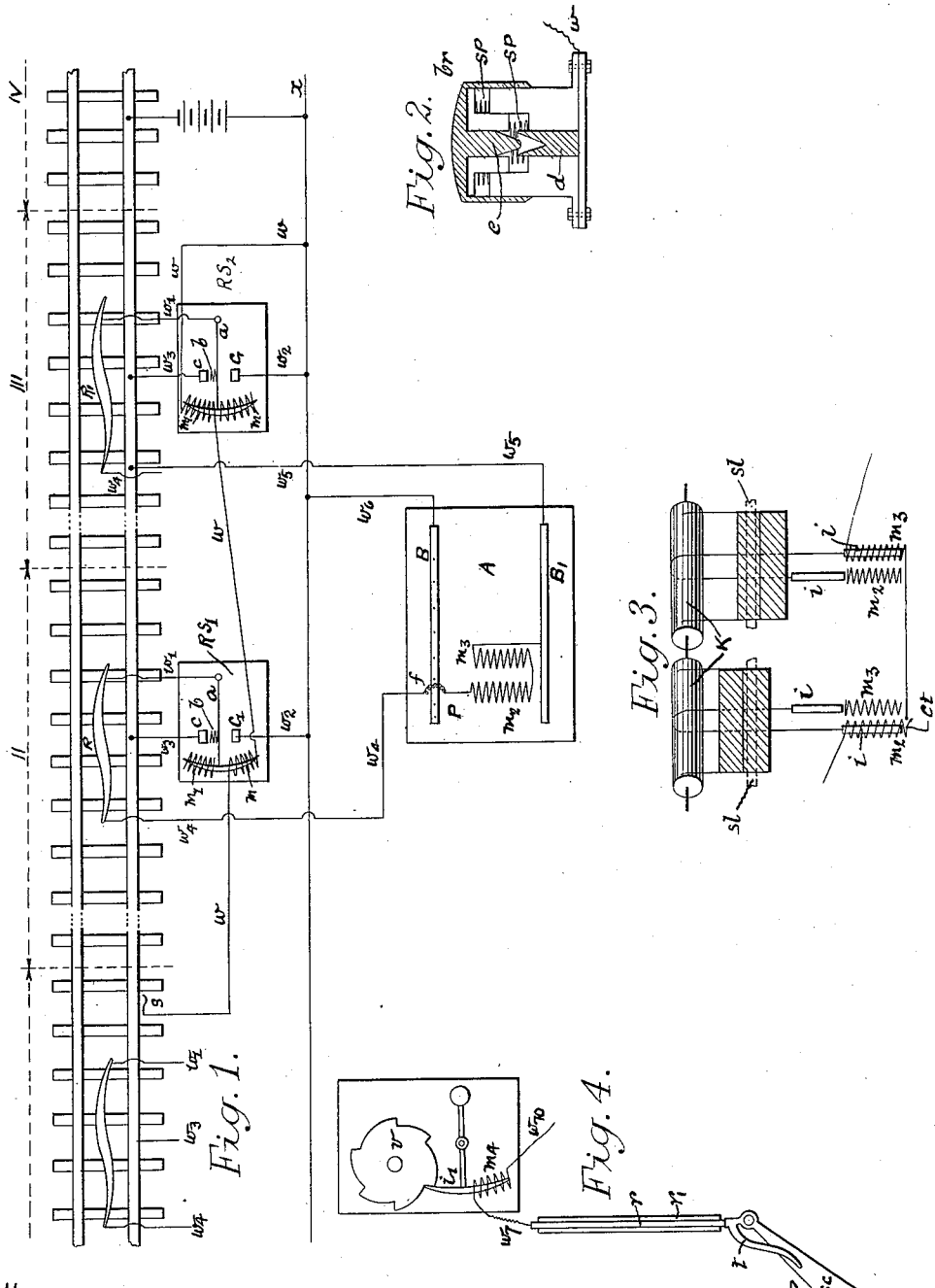

UNITED STATES PATENT OFFICE.

EDWARD WHITTAKER BOTTLE, OF LONDON, ENGLAND.

ELECTRICALLY-OPERATED SYSTEM OF AND APPARATUS FOR AUTOMATIC SIGNALING ON RAILWAYS.

1,140,659.                     Specification of Letters Patent.         Patented May 25, 1915.

Application filed October 31, 1914. Serial No. 869,526.

*To all whom it may concern:*

Be it known that I, EDWARD WHITTAKER BOTTLE, a subject of His Majesty the King of Great Britain, residing at 9 Binden road, Ravenscourt Park, London, W., England, schoolmaster, have invented a certain new or Improved Electrically-Operated System of and Apparatus for Automatic Signaling on Railways; and I do hereby declare the following to be a full, clear, and exact description of the invention, such as will enable others skilled in the art to which it appertains to make and use the same.

This invention relates to improvements in electrically operated automatic signaling systems for railways, of that kind in which a train entering a section or block operates a switch device and thereby causes an insulated contact bar or conductor in the section or block behind to be charged so that it may electrically operate an alarm or signal on the engine, the same operation of the switch also causing the discharging of a similar contact conductor or bar in the section or block behind that last referred to.

My invention comprehends a new or improved arrangement of circuits and switches for charging and discharging the contact bars or ramps and for announcing to the district signalman whether the system is working properly, he being thereby incidentally shown the position of all trains in his district. Current is supplied to all circuits from an electric main alongside the track the return being via the track rail.

According to my invention each track section comprises a track switch and a short insulated rail or ramp both just within the entrance of the section. The charging and discharging of each ramp is controlled by a two way switch operated in reverse directions by two solenoids or electromagnets. That solenoid which when excited moves the ramp switch to charge the ramp I call the charging solenoid, the other whose excitation moves the ramp switch to cause the ramp to be discharged I will refer to as the discharging solenoid. The track switch requires no re-setting being only momentarily closed by the pressure of the engine wheel against spring resistance and returning to its normal open position directly the pressure is removed. When thus momentarily closed it momentarily completes an electric circuit in which is included the charging solenoid pertaining to the ramp of the section in the rear and the discharging solenoid of the ramp in a section behind that, so that when the train enters any section the ramp of the section next behind is charged and that of the section in the rear of this discharged. The closing of any track switch also completes a circuit in which an electrically operated indicating device in the signal cabin is included. This last circuit would preferably be constituted by the ramp charging circuit, the solenoids or magnets for operating said indicating devices being included in the ramp charging circuits.

The preferred means for automatically announcing in the signal cabin that the apparatus is in proper working order and for indicating the position of all trains in the signalman's district, would comprise a fixed indicating board preferably white, having a plan of the district, showing all the sections, cut in slits, stencil-wise, therein. Each stencil cut or slit represents a track section, and behind each cut is a movable indicating member, such as a card partly colored red, the remainder being white, or the same color as the board. Each movable indicating member is adapted to be moved by an electromagnet placed in a branch circuit controlled by the track switch of the section with which it corresponds. When this branch circuit is closed the magnet is energized and moves the movable indicating member so as to exhibit its red portion through the slit corresponding with the section, thus showing the signalman that this section is occupied. When the magnet or solenoid is deënergized again, the movable indicating member is returned by any suitable means to the normal position, showing white through the slit of the white indicating board, thus indicating to the signalman that the section is empty. The movable indicating members may conveniently consist of cards connected with light rollers, as by thin cords or wires, so that they will be moved as required by turning the rollers on their axes. Or instead of cards, suitable painted rollers may be arranged behind the slits indicating the sections. The rollers may carry iron armatures to be attracted by the energized electro-magnets, or be otherwise operated by electro-magnets or solenoids. Other suitable indicating apparatus may be substituted and operated from the branch circuit aforesaid. If desired in lieu of movable indicating members, lamps may be placed behind the apertures in the board and lighted or extinguished by obvious modifications.

I will now describe the manner of performing my invention having reference to the annexed drawings wherein:—

Figure 1 shows diagrammatically a single unit of the system (a unit involving three consecutive sections) and the wiring arrangements for the working of this unit only. Fig. 2 is a vertical section of a suitable construction of track switch. Fig. 3 shows diagrammatically a method of operating the indicators in the signal cabin, and Fig. 4 shows diagrammatically suitable means for electrically operating the engine alarm.

Referring to Fig. 1, $s$ indicates a track switch in section I, R a ramp in section II and R' a ramp in section III. The switch arm $a$ of each ramp switch is adapted to be moved in opposite directions, so as to make contact with either of two fixed contacts $c$ or $c'$, by means of two solenoids $m$ $m'$. I will designate $m$ the charging solenoid and $m'$ the discharging solenoid. When the wheel of a train traveling to the left passes over the switch $s$ it momentarily passes it and so earths to the track rail a current running from the main conductor $x$ by way of the wire $w$, the discharging solenoid $m'$ of ramp switch $RS^2$, and the charging solenoid $m$ of ramp switch $RS'$. This momentary current causes charging solenoid $m$ to pull over the arm $a$ of ramp switch $RS'$ into contact with the fixed contact $c'$ thereby causing current from the main to flow through wire $m^2$ switch arm $a$ and wire $w'$ and charge the ramp R. Simultaneously the arm $a$ of ramp switch $RS^2$ is pulled over into contact with fixed contact $c$ by its discharging solenoid $m'$ thereby connecting ramp R' with the track rail through wire $w''$ switch arm $a$ and wire $w^3$ and thus discharging said ramp. The discharging contact of switch arms $a$ should be momentary only and this may be effected as by a spring, indicated by $b$, attached to the arm $a$, whereby said arm will be instantly brought away from contact $c$, or by other suitable means. So long as the train is in section 1, the ramp R of section II remains charged, and when a following train arrives at section II this charged ramp will cause the engine alarm to be sounded and warn the driver to stop. When the first train enters the section ahead of section I and operates the track switch thereof, ramp R will be caused to discharge to the rail as described with reference to ramp R'.

Signal cabin indication is shown in the drawings as effected as follows:—From the ramp R a wire $w^4$ leads to a solenoid $m^2$ adapted to operate one of a series of indicators on a cabin board A having slits or apertures formed therein to represent the track sections, as previously described, each indicator showing through a section aperture and corresponding with a track section. The indicator operated by solenoid $m^2$ corresponds with section I. From solenoid $m^2$ the current passes to the supplementary solenoid $m^3$ whose function is to oppositely move or operate the adjacent indicator which corresponds with section II, so that when solenoid $m^2$ operates its indicator to show section I is occupied, solenoid $m^3$ will operate the adjacent indicator to show section II is clear. From solenoid $m^3$ the circuit to earth is completed through the bar B' on the cabin board and wire $w^5$. Fig. 3 shows indicators 1 consisting of partly-colored cards suspended by cords from rollers $k$, $s'$ indicating the slots in the indicating board behind which these cards are moved by partial rotation of the rollers, here shown as effected by passing over each roller a cord having an armature $i$ suspended from each end, one armature being that of the operating solenoid $m^2$ of the indicator and the other that of the supplementary solenoid $m^3$ in the operating circuit of the preceding indicator. The solenoids $m^2$ $m^3$ should either be of high resistance, or preferably their armatures should be adapted to automatically make and break the circuit in any suitable manner so as to make the indicating circuit momentary and thus prevent leakage of current from the ramps. For example the armature $i$ moving downward may force open a spring contact $ct$ Fig. 3 and thus break the circuit.

A portion of each indicating circuit consists of a movable but normally fixed connection $f$ (Fig. 1) having a plug $p$. This latter can be detached from the indicating circuit and inserted in one of a series of holes, each corresponding with a ramp, in a brass bar or conductor B provided on the indicating board and connected with the main by the wire $w^6$. This arrangement is provided so that in an emergency the signalman may be able to charge any desired ramp from his box, by inserting a plug $p$ in the proper hole should the proper working of the system fail from any cause.

A suitable construction of track switch is illustrated in Fig. 2, the same comprising a socketed base and a plug movable vertically therein, both being of pottery or other suitable insulating material and marked $pt$. The said base is fitted with the female brass contact member $d$ and the plug with the male brass contact member $e$.

$sp$ indicate springs for separating the contact members. The upper or male contact member may be formed as shown to provide a protective cap $br$ for the device, or a rubber or like washer may be substituted and surround the external annular gap between the base and plug.

The ramp switches may be of any suitable construction provided they are adapted to give a continuous contact in one direction and a momentary one in the other.

Fig. 4 shows a convenient arrangement of electrically operated engine alarm. $i'$ is a counterweighted armature adapted to act as a detent to the ratchet wheel $v$ which controls a clockwork alarm bell. When the solenoid $m^4$ is energized the armature is drawn down and releases the bell mechanism. The solenoid $m^4$ takes current from the charged ramp through the scraper $sc$, the insulated rod $r$ on which the latter is pivotally carried, and the wire $w^7$, the current being earthed through the wire $w^{70}$ and engine frame. $t$ is a spring for insuring close contact between the scraper and ramp, and $r'$ indicates an insulating sleeve around rod $r$. Any other suitable device for picking up current from a charged ramp and causing such current to start or sound an alarm may be substituted.

The ramps, which as shown lie between the rails and are properly insulated, should incline downwardly at their ends to decrease shock when contact is made. If the engine carries a brush or wheel contact the ramps would be of the well known flat topped straight type; if, however, the engine carries a scraper, such for example as illustrated, then the ramps would resemble an inverted V in transverse section and would further have a longitudinal curvature as shown in Fig. 1. This ridged formation throws off rain, snow and the like, assists to keep the insulators dry, and being narrow is not liable to become coated with ice, which in any case the pressure of the scraper would remove. The longitudinal curvature distributes the wear and tear over the entire breadth of the scraper and prevents its edge from becoming grooved or scored.

What I claim and desire to secure by Letters Patent of the United States is:—

1. A railway signaling system divided into a series of blocks or stations; a source of electric current for said stations; each of said stations including a ramp rail, a switch movable in reverse directions and connected to said ramp rail, a pair of oppositely disposed electromagnetic means for actuating said switch, and a track-switch; and means electrically connecting said track-switch with alternate members of the pairs of said electromagnetic means at each of two stations succeeding that at which said track-switch is installed whereby, when said track-switch is operated, the ramp rail in the next succeeding station will be connected with said source of current and the ramp rail at the second succeeding station will be disconnected from said source of current.

2. A railway signaling system divided into a series of blocks or stations; a source of electric current for said stations; each of said stations including a ramp rail, a pair of fixed contacts connected, respectively, to the positive and negative sides of said source of current, a switch connected to said ramp rail and movable against said fixed contacts, a pair of oppositely disposed electromagnetic means for actuating said switch, and a track-switch; and means electrically connecting said track-switch with alternate members of the pairs of said electromagnetic means at each of two stations succeeding that at which said track-switch is installed whereby, when said track-switch is operated, the switch at the next succeeding station will be moved against the fixed contact connected with the positive side of the source of current and the switch at the second succeeding station will be moved against the fixed contact connected with the negative side of said source of current.

3. A railway signaling system divided in a series of blocks or stations; a source of electric current for said stations, each of said stations including a ramp rail; a pair of fixed contacts connected respectively to the positive and negative sides of said source of current, a switch movable into engagement with said contacts and connected to said ramp rail, flexible means carried by said switch for immediately returning the latter to neutral position after making contact with the contact connected to the negative side of said source of current, oppositely disposed solenoids adapted to move said switch against said contacts, and a track-switch; and means electrically connecting said track-switch with alternate solenoids at two stations succeeding that at which the track-switch is installed whereby, when said track-switch is operated, the switch at the first succeeding station will be moved against the contact connected with the positive side of said source of current to electrically charge the ramp rail at said station and the switch at the second succeeding station will be momentarily moved against the contact connected with the negative side of said source of current whereby the ramp rail at that station will be electrically discharged.

4. A railway signaling system divided into a series of blocks or stations; a source of electric current for said stations, each of said stations including a ramp rail, a switch connected to said ramp rail, oppositely disposed fixed contacts against which said switch may be moved and which contacts are connected respectively to the positive and negative sides of said source of current, a pair of solenoids at opposite sides of said switch for moving the same into engagement with said contacts, and a spring returned track-switch adjacent the railway tracks; and means electrically connecting the said track-switch with alternate solenoids of each of the pairs of solenoids at two stations succeeding that at which the track-switch is installed whereby, when the track-switch is operated by a passing vehicle, the switch at the first succeeding station will be moved to connect the ramp rail with the positive side of the source of current and the switch at the second succeeding station will be moved to disconnect the ramp rail of that station from the positive side of the source of current.

5. A railway signaling system divided into a series of blocks or stations; a source of electric current for said stations; each of said stations including a ramp rail, a switch movable in reverse directions and connected to said ramp rail, a pair of oppositely disposed electromagnetic means for actuating said switch, and a track-switch; means electrically connecting said track-switch with alternate members of the pairs of said electromagnetic means at each of two stations succeeding that at which said track-switch is installed whereby, when said track-switch is operated, the ramp rail in the next succeeding station will be connected with said source of current and the ramp rail at the second succeeding station will be disconnected from said source of current, and electrically operated means connected to the ramp rails for indicating the condition of the blocks in said system.

6. A railway signaling system divided into a series of blocks or stations; a source of electric current for said stations; each of said stations including a ramp rail, a switch movable in reverse directions and connected to said ramp rail, a pair of oppositely disposed electromagnetic means for actuating said switch, and a track-switch; means electrically connecting said track-switch with alternate members of the pairs of said electromagnetic means at each of two stations succeeding that at which said track-switch is installed whereby, when said track-switch is operated, the ramp rail in the next succeeding station will be connected with said source of current and the ramp rail at the second succeeding station will be disconnected from said source of current, and electrically operated means connected to the ramp rails for indicating the condition of the blocks in said system, said last named means including an apertured board, indicating means movable relatively thereto, and electromagnetic means for moving said indicating means in relation to said board.

In testimony whereof I have hereunto set my hand in the presence of two witnesses.

EDWARD WHITTAKER BOTTLE.

Witnesses:
HERBERT D. JAMIESON,
O. J. WORTH.

Copies of this patent may be obtained for five cents each, by addressing the "Commissioner of Patents, Washington, D. C."